United States Patent [19]

Lutz et al.

[11] Patent Number: 5,684,633

[45] Date of Patent: Nov. 4, 1997

[54] POLYMERIC REFLECTIVE MATERIALS UTILIZING A BACK LIGHT SOURCE

[75] Inventors: William Gary Lutz, Linwood; Gregg Allen Motter; John Allen Wheatley, both of Midland, all of Mich.

[73] Assignee: TheDow Chemical Company, Midland, Mich.

[21] Appl. No.: 437,783

[22] Filed: May 9, 1995

Related U.S. Application Data

[63] Continuation of Ser. No. 192,248, Feb. 7, 1994, abandoned, which is a continuation of Ser. No. 969,710, Oct. 29, 1992, abandoned.

[51] Int. Cl.$^6$ .............................. G02B 1/10; G02B 5/28; G02B 5/22; F21V 9/00

[52] U.S. Cl. .................... 359/588; 359/586; 359/590; 362/293

[58] Field of Search .......................... 359/359, 580, 359/586, 588, 590, 587; 362/166, 293

[56] References Cited

U.S. PATENT DOCUMENTS

| | | |
|---|---|---|
| 3,711,176 | 1/1973 | Alfrey, Jr. et al. . |
| 4,046,457 | 9/1977 | Land et al. . |
| 4,047,804 | 9/1977 | Stephens . |
| 4,162,343 | 7/1979 | Wilcox et al. . |
| 4,948,216 | 8/1990 | Brazas, Jr. et al. . |
| 5,095,210 | 3/1992 | Wheatley et al. . |
| 5,103,337 | 4/1992 | Schrenk et al. . |
| 5,122,905 | 6/1992 | Wheatley et al. . |
| 5,122,906 | 6/1992 | Wheatley . |
| 5,126,880 | 6/1992 | Wheatley et al. . |
| 5,149,578 | 9/1992 | Wheatley et al. . |
| 5,178,955 | 1/1993 | Aharoni et al. ................... 359/580 |
| 5,200,108 | 4/1993 | Yuasa et al. . |
| 5,233,465 | 8/1993 | Wheatley et al. . |
| 5,262,894 | 11/1993 | Wheatley et al. . |
| 5,278,694 | 1/1994 | Wheatley et al. . |

OTHER PUBLICATIONS

Ron Cogan, "On the Road to a Green Future", *Motor Trend*, Mar. 1993, pp. 81–83.

*Primary Examiner*—Jon W. Henry

[57] ABSTRACT

A multilayered reflective body which is thermoformable and capable of being fabricated into a number of parts while maintaining a uniform reflective appearance is provided. The reflective polymeric body is formed from at least two diverse polymeric materials which differ in refractive index and which are arranged in substantially parallel alternating layers. The polymeric body is reflective in appearance yet is transparent or, colored if a coloring agent is included, upon illumination from a back light source. The polymeric body has application in variety of areas such as in an automobile lighting lens which is reflective and thereby indiscernible yet transmissive upon exposure to a back light source. Additionally, various parts of consumer appliances, for example a refrigerator door, can be formed from the polymeric body.

28 Claims, 11 Drawing Sheets

3
POLYMERIC REFLECTIVE MATERIALS UTILIZING A BACK LIGHT SOURCE

This application is a continuation of application Ser. No. 08/192,248, filed Feb. 7, 1994, now abandoned, which is a continuation of application Ser. No. 07/969,710, filed Oct. 29, 1992, now abandoned.

BACKGROUND OF THE INVENTION

The present invention generally relates to a multilayer reflective polymeric body or film which, when illuminated by means of a back light source, transmits such light. The invention also relates to articles produced therefrom which include decorative trim, lighting lenses for automotive, commercial and residential lighting applications, and structural parts such as refrigerator doors, and the like. The present invention also relates to a method by which such articles can be produced from the multilayer reflective polymeric body or film without causing undesirable iridescent colors.

By way of example, in the automotive industry, automobile stylists and designers are always seeking ways in which a particular vehicle's appearance can be differentiated. Most recently, automobiles have been approaching very similar designs in view of the rather limited number of ways in which automobiles bodies can be aerodynamic as well as fuel efficient. Consequently, stylists and designers are faced with the formidable task of differentiating such vehicles.

To the extent that vehicle headlights, taillights and the like are required for functional purposes, designs of the vehicle adjacent to areas where lights are needed have been limited since the associated lighting lenses disrupt the styling contours on the vehicle and exhibit color mismatches. Thus, it is desirable to be able to render vehicle lights indiscernible by blending the vehicle body lines, colors, and/or decorative trim with a reflective and/or colored surface which conceals the lighting, and yet conforms to standard lighting requirements when the lights are illuminated.

Such a design option would also find utility in a wide variety of other areas in addition to the automotive industry. For example, in the area of consumer appliances, the housings on such appliances could be made to exhibit one color or appearance when viewed and yet permit internal items to become visible when illuminated. For example, a refrigerator door or portion thereof could be reflective and/or colored to match, blend, or contrast with the remainder of the appliance and yet become transparent when illuminated by a light inside the refrigerator so as to expose its contents to view without opening the door.

Additionally, in the areas of commercial and residential lighting, it would be desirable to be able to provide lights which would blend in with the chosen decor, and yet illuminate a room when turned on. This would expand on the variety of options available for interior decoration and the styles of lamps and lighting. For example, in restaurants, nightclubs and the like, hand rails, floor tiles, panels, etc., it would be desirable to have such items reflective in appearance yet appear differently when back lit.

Conventional methods for fabricating reflective surfaces include forming such surfaces of highly polished metals. Such polished metal surfaces are useful to reflect light but such surfaces are opaque and they cannot be used to hide lamps or other lighting from view. Because of the high costs, weight, environmental concerns, and fabricating problems involved in using metals, there has been a shift to use plastic surfaces which contain thin coatings of metal thereon.

Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like. Again, however, such reflective surfaces are designed to be substantially opaque and cannot be used to conceal lamps or other lighting from view.

There have been a wide multitude of lighting designs in several areas such as the automobile industry. For example, Goldbaum et al, U.S. Pat. No. 3,321,618 disclose an automotive vehicle lamp assembly with a snap-in lens and Kirsch, U.S. Pat. No. 4,020,338 discloses an automobile lighting lens which provides an adaptor for styling headlights. Further, Egawa et al, U.S. Pat. No. 5,005,949, discloses an anti-glare covering for illuminated lights which substantially reduces perceived glare from lighting. However, none of these attempts in the art provide a lighting lens or covering which possesses the desired feature of reflectivity and yet transmissivity upon exposure to a back light source.

Multilayer articles of polymers are known, as are methods and apparatus for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in substantially uniform layer thicknesses. The number of layers may be multiplied by the use of a device as described in commonly-assigned U.S. Pat. No. 3,759,647 to Schrenk et al.

Alfrey, Jr. et al, U.S. Pat. No. 3,711,176, teach a multilayered highly reflective thermoplastic body fabricated using thin film techniques. That is, the reflective thin film layers of Alfrey, Jr. et al relied on the constructive interference of light to produce reflected visible, ultraviolet, or infrared portions of the electromagnetic spectrum. Such reflective thin films have found use in decorative items because of the iridescent reflective qualities of the film. See also, Cooper, U.S. Pat. No. Re. 31,780.

However, the films of Alfrey, Jr. et al are extremely sensitive to thickness changes, and it is characteristic of such films to exhibit streaks and spots of nonuniform color. Further, color reflected by such films is dependent on the angle of incidence of light impinging on the film. Thus, such films are not practical for uses which require uniformity of reflectivity. Moreover, such films are not practical to thermoform into articles since localized thinning of the layers during thermoforming causes alterations in the reflective characteristics of the films.

More recently, reflective multilayer polymeric films and sheets formed of optically thick layers (optical thickness of greater than about 0.45 µm), a combination of optically thick and optically very thin layers (optical thickness of less than about 0.09 µ), or combinations of optically thick, optically thin, and optically very thin layers have been taught which exhibit a substantially colorless uniform silvery reflective appearance. See, Wheatley et al, U.S. Pat. No. 5,122,905; Wheatley, U.S. Pat. No. 5,122,906; and Wheatley et al, U.S. Pat. No. 5,126,880. Wheatley et al teach using these reflective films and sheets for many of the same uses as polished metal and metallized plastic sheets have been heretofore used.

Accordingly, the need still exists in this art for a polymeric body or film which is reflective, and yet is capable of transmitting light upon exposure to a back light source for a variety of applications including automotive, commercial, and residential applications. There is also a need for a method of forming such a polymeric body or film into a variety of useful shapes.

SUMMARY OF THE INVENTION

The present invention meets the above-described needs by providing a polymeric body which is reflective in appearance, and yet which transmits light upon exposure to a back light source and by providing a method for forming such a polymeric body into useful shapes. The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15° centered around the specular angle.

A specific intensity of reflectance, when used herein, is the intensity of reflection which occurs at a wavelength where negligible absorption occurs. For example, a silver appearing article reflects substantially all visible wavelengths, whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflection pertains. With respect to transmission of light through the body, the specific percentages reported are with respect to nonabsorbing wavelengths.

In accordance with one aspect of the invention, a multilayer reflective polymeric body of at least first and second diverse polymeric materials arranged in substantially parallel alternating layers is provided. The body has first and second major surfaces, wherein the first and second polymeric materials differ from each other in refractive index by at least 0.03. The body includes a sufficient number of layers such that the body reflects at least 40% of light impinging on the first major surface thereof while transmitting at least 5% of light directed through the body from the second major surface. Preferably, the body includes a coloring agent incorporated in or present on at least one of the first and second major surfaces such that when the body is illuminated, the body exhibits the color of the coloring agent.

The reflective polymeric body of the invention may take a variety of forms. For example, in a preferred embodiment, the polymeric body may be in the form of a film or sheet. In addition, the polymeric body may be in the form of a lighting lens for a vehicle. Further, the reflective polymeric body can be in the form of a decorative trim part for a vehicle or in the form of a housing or part of a housing for a consumer appliance such as a door or portion thereof for a refrigerator. Additionally, the reflective polymeric body of the invention may have at least one of the first and second major surfaces of the body comprising first and second portions, wherein the first portion has the coloring agent incorporated in or present thereon and the second portion is substantially transparent upon exposure to light directed through the body from the second major surface thereof.

Further, one color on the first surface and a different color on the second surface is possible. For example, a red coloring agent can be present in or on the first surface while the second surface includes a green coloring agent resulting in the polymeric body appearing red in reflection and neutral or gray upon exposure to a back light source. Similarly, different color combinations on the first and second surfaces of the polymeric body, respectively, can interact to produce a third color when back lit.

A number of substantially transparent polymers are suitable for use in the present invention. In a preferred embodiment, the first polymeric material may be a polyurethane and the second polymeric material may be polymethylmethacrylate. Alternatively, the first polymeric material can be a polyurethane while the second polymeric material is a polyether imide. Other combinations of polymers include the combination of a polycarbonate with a miscible blend of polyvinylidene fluoride and polymethylmethacrylate, the combination of polystyrene with a copolymer of ethylene and at least one unsaturated monocarboxylic acid, the combination of polystyrene with polymethylmethacrylate, and the combination of a polycarbonate with polymethylmethacrylate.

In certain embodiments of the invention, to obtain high reflectivity, it is desirable to form the reflective polymeric body to comprise at least 500 or more layers. Increasing the total number of layers in the polymeric body has been found to increase its reflectivity (i.e., the percentage of incident light reflected from the body). Thus, by controlling the number of layers, the degree of reflectivity of the article may be controlled. Preferably, the reflectivity should not be too high so as to maintain the preferred level of transmissivity, namely, at least 5%. It should be understood, however, that an intense light source, such as a light-emitting diode (LED), can be used as the back light source resulting in transmission of light even with a polymeric body which is 95% reflective.

The coloring agent used in the polymeric body is preferably selected from the group consisting of pigments and dyes. Metallic colors such as gold, bronze, or copper may be used. Other colors such as black, blue, red, yellow, white, and the like may also be used. Additionally, the polymeric body may contain a second coloring agent incorporated into at least one of the layers between the first and second major surfaces of the body. In this way, coloring agents may be used in combination to provide desirable coloring and optical properties. For example, a gold or other bright metallic trim or lens can be produced from the polymeric body that can be illuminated to create an illuminated gold, copper, bronze decorative trim or lens. Further, a white coloring agent may be used in an interior surface while a colored dye, such as blue, yellow, red, or green, may be included on one or more surface layers to provide a unique reflective colored effect.

Further, while the normal surface of the polymeric body is smooth to give a highly reflective specular silver appearance, in some instances it may be desirable to give the surface of the polymeric body a roughened, grained or brushed appearance to simulate a brushed metallic appearance. Further, a solvent may be used to etch the surface of the multilayer body to provide a matte or pewter look to the polymeric body. Additionally, the polymeric body may be embossed with a variety of patterns to provide desirable optical effects.

In addition, at least one surface of the polymeric body may have indicia printed thereon to illuminate information upon exposure to a back light source and to conceal such information when not exposed to light. In that regard, the polymeric body of the invention may be used in the interior of a vehicle, for example, to illuminate controls with the appearance of a chrome knob with a green label or printed indicia indicating "volume" when traveling during the night. Further, a bright exterior vehicle door trim can include text printed in or on one of the layers of the polymeric body which forms the trim so as to illuminate the keyhole.

In all of the aforedescribed embodiments, the particular polymers and the optical thicknesses of the layers are preferably chosen such that there is an absence of visibly perceived iridescence. To that end, suitable polymer combinations and the manner in which the optical thicknesses are chosen to provide a substantially noniridescent polymeric body is set forth in Wheatley et al, U.S. Pat. No. 5,122,905, Wheatley, U.S. Pat. No. 5,122,906, and Wheatley et al, U.S. Pat. No. 5,126,880.

Additionally, the multilayer reflective polymeric bodies of the present invention may be formed by a variety of ways. For example, the polymeric body can be formed using the extrusion die, i.e., profile extrusion as described in Wheatley et al, U.S. Pat. No. 5,126,880. Additionally, post-forming operations can be used which include thermoforming, vacuum forming and pressure forming. In a preferred embodiment, the polymeric body is thermoformable. Further, through the use of forming dies, the polymeric body may be initially formed into a variety of useful shapes including parts for automotive, commercial and residential lighting applications. In addition, component fabrication techniques including insert injection molding, ultrasonic welding, adhesive bonding, and other attachment and welding methods can be used to fabricate the present polymeric body into the desired part.

Another aspect of the invention is directed to the polymeric body having an image projected on a surface thereof and which can be back lit with, for example a LED (light emitting diode), to be used as a pointer or the like. Further, an array of light sources such as LEDs can be used in, for example, display panels, automotive decorative lamps, centered high-mounted stop lamps and the like. Preferably, this embodiment comprises a multilayer reflective polymeric body of at least first and second diverse polymeric materials arranged in substantially parallel alternating layers wherein the first and second polymeric materials differ from each other in refractive index by at least 0.03. The body has first and second major surfaces wherein an image is projected onto the first major surface of the body. The body includes a sufficient number of layers such that the body reflects at least 40% of light impinging on the first major surface thereof while transmitting at least 5% of light directed through the body from the second major surface so as to illuminate the image on the first major surface. It should be understood that high intensity light sources such as LEDs are sufficient to penetrate polymeric bodies capable of transmitting only 5% of light directed through the body.

In another aspect of the invention, a colored light source is provided. A light source is enclosed by a multilayered reflective polymeric sheet or film having first and second major surfaces wherein the second major surface faces the light source and the first major surface faces opposite the second major surface. The sheet or film has at least first and second diverse polymeric materials arranged in substantially parallel alternating layers, the sheet or film including a coloring agent incorporated in or present on at least one of the first and second major surfaces, wherein the first and second polymeric materials differ from each other in refractive index by at least 0.03. The sheet or film includes a sufficient number of layers such that the film reflects at least 40% of light impinging on the first major surface thereof while transmitting at least about 5% of light directed through the body from the second major surface such that when the body is illuminated, the polymeric body exhibits the color of the coloring agent.

Further, the present invention may find use in a lamp assembly comprising a light source mounted in a housing having at least one surface in the form of a lighting lens. The lighting lens comprises at least first and second diverse polymeric materials arranged in substantially parallel alternating layers. The lighting lens has first and second major surfaces wherein the second major surface faces the light source and the first major surface faces opposite the second major surface. Preferably, the lighting lens has a coloring agent incorporated in or present on at least one of the first and second major surfaces, wherein the first and second polymeric materials differ from each other in refractive index by at least 0.03. The lighting lens includes a sufficient number of layers such that the lighting lens reflects at least 40% of light impinging on the first major surface thereof while transmitting at least 5% of light directed through the body from the second major surface such that when the body is illuminated, the polymeric body exhibits the color of the coloring agent.

In accordance with another aspect of the invention, a multilayer reflective polymeric body of at least first and second diverse polymeric materials arranged in substantially parallel alternating layers which define at least one edge of the body is provided. The body has first and second major surfaces substantially parallel to the layers, and includes a coloring agent incorporated in or present on at least one of the layers. The first and second polymeric materials differ from each other in refractive index by at least 0.03, the body including a sufficient number of layers such that the body reflects at least 40% of light impinging on the first major surface thereof while transmitting at least 5% of light directed through the edge of the body. Preferably, at least one of the first and second major surfaces includes irregularities thereon such that when the edge is illuminated, the body exhibits the color of the coloring agent. As used herein, irregularities encompasses notches, conical dots or indentations, conical protrusions, embossments, surface abrasions or any other shaped indentation or protrusion which would render the surface other than uniformly smooth.

Another aspect of the invention is directed to a method for forming a reflective multilayer polymeric body having essentially no visually perceived iridescence. The method comprises the step of providing a molding assembly including a mold having a face half and a corresponding core half together which define the contour of the product. The face half and the core half of the mold each have a press platen adapted to compress the face half and the core half against one another. The molding assembly includes means for cushioning the mold when the face half and the core half are compressed together by the press platens to mold the product. The method further comprises the steps of inserting between the face half and the core half of the mold a formable multilayer reflective polymeric sheet having essentially no perceived iridescence, and compressing each of the press platens in the molding assembly such that the face half and the core half of the mold are compressed against the sheet while the cushioning means cushions the mold to prevent uneven flowing and thinning of the layers in the sheet or film to produce the product. Such uneven flowing and thinning in the sheet or film causes iridescence in the resulting product.

In a preferred embodiment, the cushioning means comprises an elastomeric blanket inserted between the face half and the core half of the mold. Additionally, or alternatively, the cushioning means may comprise an elastomeric blanket inserted between at least one of the press platens and the mold. Another embodiment of the present method includes the step of forming at least one of the core half and the face half from an elastomeric material to serve as the cushioning means.

Accordingly, it is an object of the invention to provide a polymeric body or film which is reflective, and yet transmits light upon exposure to a back light source for a variety of applications including automotive, commercial, and residential applications; and, it is also an object of the invention to provide a method for making such a polymeric body or film. Other objects and advantages of the invention will be apparent from the following detailed description, the accompanying drawings and the appended claims.

BRIEF DESCRIPTION THE DRAWINGS

DETAILED DESCRIPTION OF THE PREFERRED EMBODIMENTS

Figure 1:
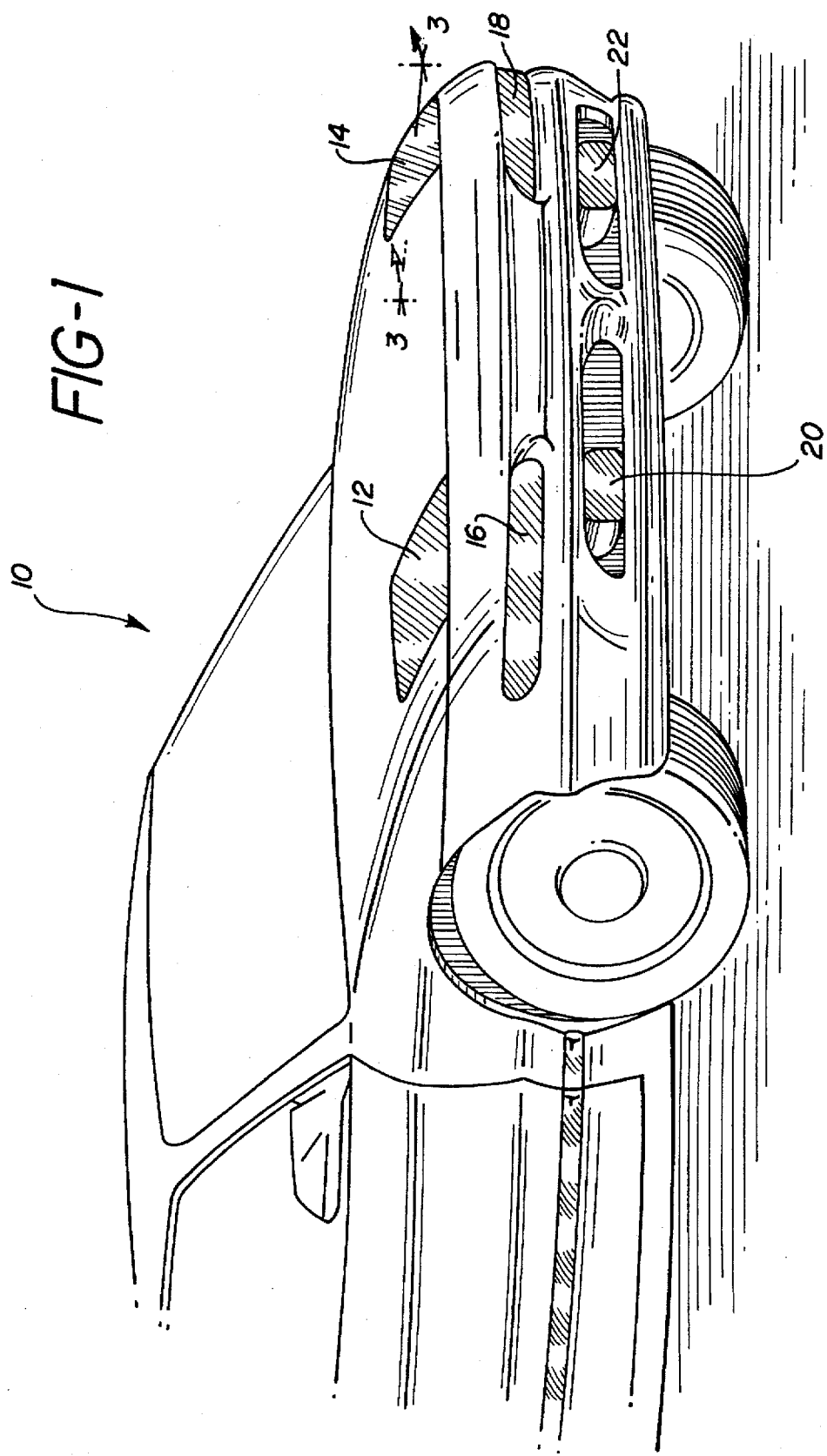
FIG. 1 is a fragmentary perspective view of an automobile in which the polymeric body of the invention is used in its lighting system.

The present invention provides a polymeric body which is reflective, and yet transmits light upon exposure to a back light source. A method for forming the polymeric body is also provided and will be discussed in detail below. Such a polymeric body finds use in a wide variety of applications including but not limited to automotive, residential and commercial applications. Those skilled in the art will appreciate the multitude of ways in which a polymeric body, which is reflective and yet transmits light upon exposure to a back light source, can be applied in various areas other than those explicitly described herein.

As stated above, the preferred polymeric body is a multilayered, reflective material comprising at least two diverse polymeric materials arranged in substantially parallel alternating layers which, in most applications, has at least two major surfaces with a coloring agent incorporated in or present on one of the major surfaces. The polymeric materials differ in refractive index by at least 0.03. Preferably, the polymeric body should comprise a sufficient number of layers such that the body reflects at least 40% of light impinging one of the major surfaces thereof while transmitting at least 5% of light directed through the polymeric body when illuminated with a back light source.

For most applications, it is preferred that the polymeric body has an absence of visually perceived iridescence. In fact, it is an object of the method of the invention to form a polymeric film or sheet material which does not exhibit iridescence into a product which also does not display such iridescence. Consequently, the polymeric body of the invention should specifically avoid layer thicknesses which would result in substantial iridescent color. On the other hand, alternating layers too thick to cause iridescence, in combination with layers too thin to cause iridescence, result in a body which exhibits an essentially uniform silver and non-iridescent appearance. This silvery appearance, which is desired for the invention, is due to higher order reflections from the optically thick layers being so closely spaced that the human eye perceives the reflection to be essentially non-iridescent.

There are an unlimited number of ways in which the alternating layers of the polymeric body can be designed to provide this silvery appearance along with the other desired properties for use with a back light source. For example, reflective multilayer polymeric films and sheets can be formed of optically thick layers (optical thickness of greater than about 0.45 µm) or a combination of optically thick and optically very thin layers (optical thickness of less than about 0.09 µm), or a combination of optically thick, optically thin (optical thickness of between 0.09 and 0.45 µm), and optically very thin layers which exhibit a substantially colorless uniform silvery reflective appearance. Specifically, the manner in which the optical thicknesses are chosen is set forth in Wheatley et al, U.S. Pat. No. 5,122,905, Wheatley, U.S. Pat. No. 5,122,906, and Wheatley et al, U.S. Pat. No.

5,126,880, all of the disclosures of which are incorporated herein by reference. Furthermore, by introducing large layer thickness gradients into the layers, a broad band substantially uniformly reflective body may be produced as taught in commonly assigned U.S. Pat. Nos. 5,568,316 and 5,448,404.

Preferably, the polymers chosen have a refractive index mismatch of at least 0.03 at the visible wavelengths 380–680 nm. Typically, refractive indices of materials, including polymers, are measured at a convenient wavelength in the visible range such as 589 nm sodium vapor. As briefly stated above, several substantially transparent polymers are suitable for use in the present invention. A number of substantially transparent polymers are suitable for use in the present invention. In a preferred embodiment, the first polymeric material may be a polyurethane and the second polymeric material may be polymethylmethacrylate. Alternatively, the first polymeric material can be a polyurethane while the second polymeric material is a polyether imide.

Other combinations of polymers include the combination of a polycarbonate with a miscible blend of polyvinylidene fluoride and polymethylmethacrylate, the combination of polystyrene with a copolymer of ethylene and at least one unsaturated monocarboxylic acid, the combination of polystyrene with polymethylmethacrylate, and the combination of a polycarbonate with polymethylmethacrylate. Further, polymers and their respective refractive indices, which are useful in the practice of the present invention include all of the polymers listed in the aforementioned Wheatley et al, U.S. Pat. No. 5,122,905, Wheatley, U.S. Pat. No. 5,122,906, and Wheatley et al, U.S. Pat. No. 5,126,880, all of the disclosures of which are incorporated herein by reference.

In accordance with another aspect of the invention, a multilayer reflective polymeric sheet and film are provided. The sheet and film, like the polymeric body, preferably comprise at least two diverse polymeric materials arranged in substantially parallel alternating layers and-have two major surfaces with, optionally, a coloring agent incorporated in or present on at least one of such surfaces. As briefly discussed above and in greater detail below, the coloring agent can be included in the core layers of the polymeric body and/or in the skin or surface layers.

The polymeric materials are preferably those of which have been discussed above. The sheet and film include a sufficient number of layers such that they each reflect at least 40% of light impinging on one of the major surfaces thereof while transmitting at least 5% of light directed through the film and sheet such that when they are illuminated, they exhibit the color of the coloring agent. With the sheet and film embodiments of the invention, a multitude of additional applications are possible as those skilled in the art will appreciate.

Additionally, the polymeric body may contain a second coloring agent incorporated into at least one of the layers between the major surfaces of the body. In this way, coloring agents may be used in combination to provide desirable coloring and optical properties. For example, a gold or other bright metallic trim or lens can be produced from the polymeric body that can be illuminated to create an illuminated gold, copper, bronze decorative trim or lens. Further, a white coloring agent may be used in an interior surface while a colored dye, such as blue, yellow, red, or green, may be included on one or more surface layers to provide a unique reflective colored effect. Different colors such as black, gray, blue, red, yellow, white, and the like may also be used. For example, a pigmented white coloring agent may be used in an interior surface while a colored dye may be included on one or more surface layers to provide a unique reflective colored effect. Other examples are discussed in detail below.

Further, while the normal surface of the polymeric body is smooth to give a highly reflective specular silver appearance substantially free of iridescence in automotive styling of decorative trim and lighting, it may be desirable to give the surface of the polymeric body a roughened or brushed appearance to simulate a brushed metallic appearance. Of course, other applications may also find use for such a feature. Further, a solvent may be used to etch the surface of the polymeric body to provide a matte, diffuse, or pewter look to the body. Additionally, the polymeric body may be provided with textured clear coats or may be embossed with a variety of patterns to provide desirable optical effects for use in the aforementioned lighting applications.

Reference is now made collectively to FIGS. 1–5 which illustrate several of the many applications of the polymeric body. FIG. 1 is a perspective view of an automobile 10 having a front lighting system including a pair of head lights 12 and 14, a pair of turn signal lights 16 and 18, and a pair of fog lights 20 and 22. Since the lenses in head lights 12 and 14, turn signal lights 16 and 18, and fog lights 20 and 22 are all formed from the polymeric body as described above, the entire front portion of automobile 10 will appear as if it is devoid of lights. The cross-hatching in FIGS. 1–5 is used to indicate the position of the lenses in the various lights only since they are indiscernible when not illuminated.

Figure 2:
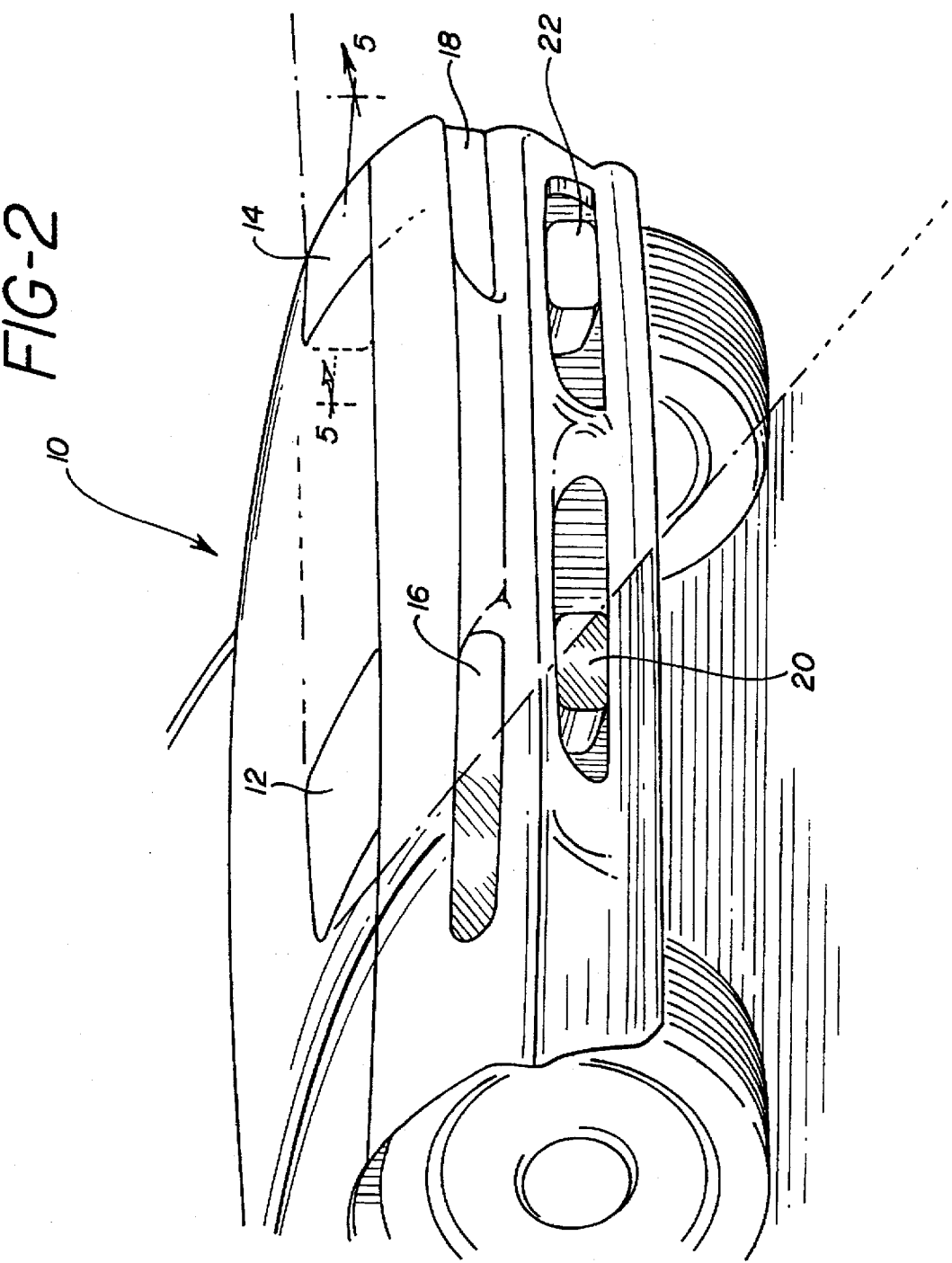
FIG. 2 is a fragmentary view of the automobile shown in FIG. 1 in which the front lighting system is illuminated.

In FIG. 2, however, head lights 12 and 14, turn signal lights 16 and 18, and fog lights 20 and 22 are illuminated such that they are each exposed to a back light source. As seen in FIG. 2, head lights 12 and 14, turn signal lights 16 and 18, and fog lights 20 and 22 transmit light so as to be operational for their intended use. Consequently, the use of the polymeric body of the invention permits head lights 12 and 14, turn signal lights 16 and 18, and fog lights 20 and 22 to be indiscernible when not in use, and yet transmit light from a back light source when desired. It should be understood that the lens or lamp source will be or contain the appropriate color. Those skilled in the art, however, will appreciate that Society of Automotive Engineers Standards and Federal Motor Vehicle Safety Standards (FMVSS) may constrict the number of possible colors for such lights, especially turn signal lights 16 and 18.

Figure 3:
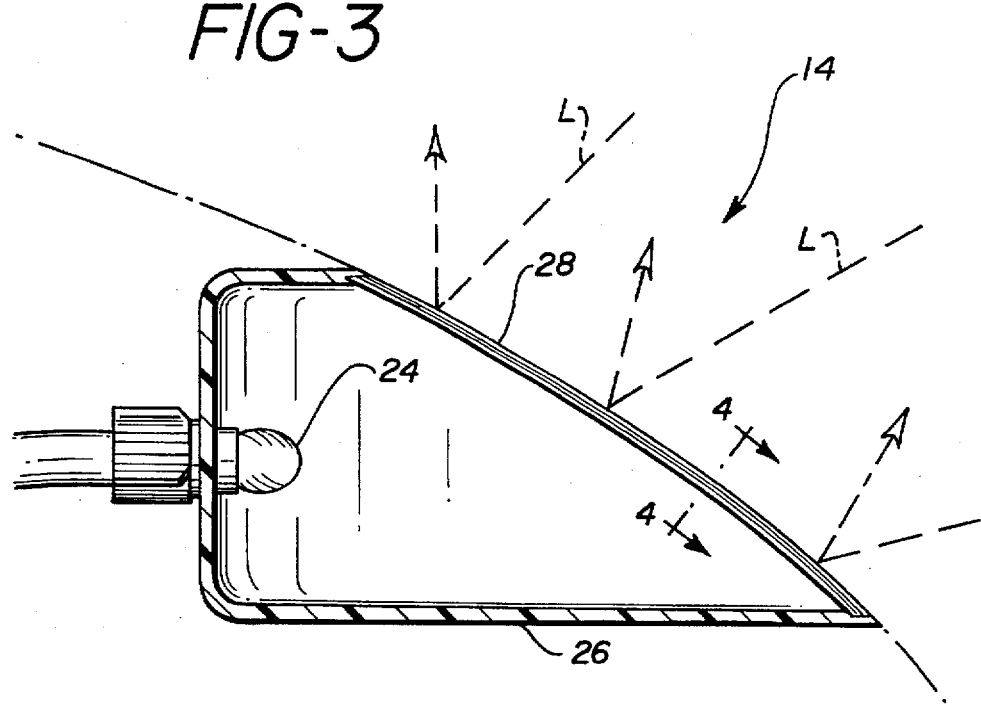
FIG. 3 is a cross-sectional view taken along view line 3—3 in FIG. 1 of one headlight of the automobile depicted in FIGS. 1–2.
Figure 5:
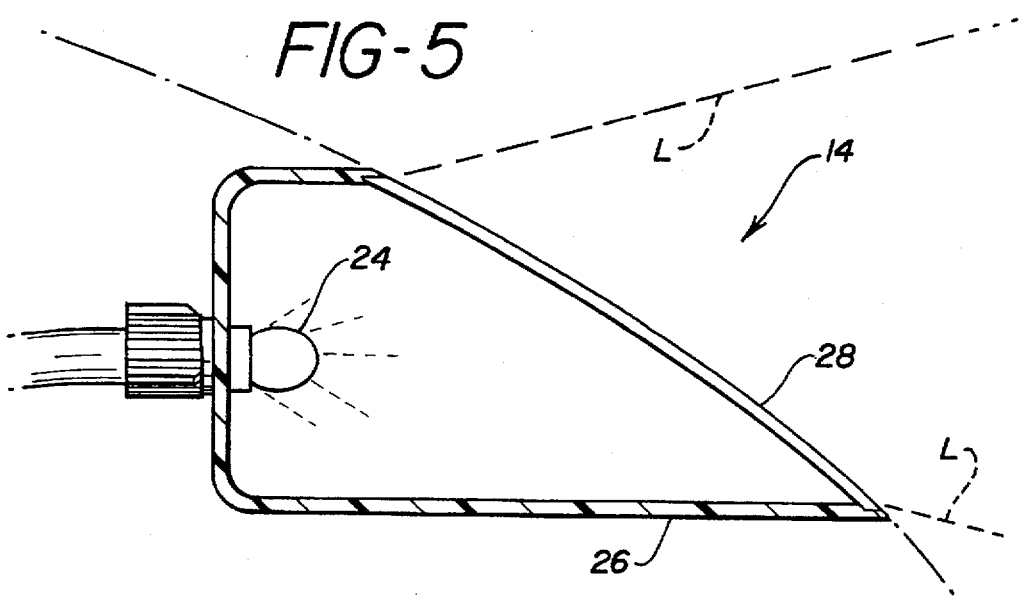
FIG. 5 is a cross-sectional view of the headlight shown in FIG. 3 in which the light source is illuminated.

To provide a more detailed understanding of this application of the polymeric body, FIG. 3 illustrates a cross-sectional view of head light 14 taken along view line 3—3 in FIG. 1, while FIG. 5 is a cross-sectional view of head light 14 in FIG. 2. Referring specifically to FIG. 3, head light 14 is depicted in the form of a lamp assembly comprising a light source 24 mounted in a housing 26 having a lighting lens 28. The lighting lens 28 of head light 14 preferably comprises the polymeric body of the invention. Accordingly, as in FIG. 1, light is shown to be reflected from the polymeric body since light source 24 is not illuminated. Those skilled in the art should understand that housing 26 and lighting lens 28 may be designed to shapes and contours other than those depicted herein. As seen in FIG. 3, light L including ambient light as well as light from other sources is reflected off of lens 28 when light source 24 is not illuminated.

Figure 4:
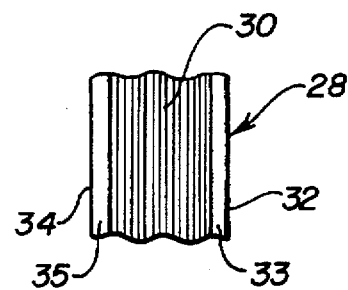
FIG. 4 is a partial cross-sectional view taken along view line 4—4 in FIG. 3 of the lighting lens in the headlight shown in FIG. 3.

FIG. 4 illustrates a cross-sectional view of the lighting lens 28 taken along view line 4—4 in FIG. 3. As depicted in FIG. 4, lighting lens 28 comprises the polymeric body having at least two diverse polymeric materials arranged in substantially parallel alternating layers, collectively designated by reference numeral 30. The polymeric body, which is in the form of lighting lens 28, has two major surfaces 32 and 34 upon which light is either reflected or transmitted. Optionally, a coloring agent can be incorporated in the various layers 30 and/or be present on one or both of the major surfaces 32 and 34 of lighting lens 28 so as to emit a colored light, for example, an amber dye or pigment for turn signal lights 16 and 18 shown in FIG. 2. FIG. 4 depicts a pair of cap layers 33 and 35 which may also include a coloring agent for similar purposes.

Reference is now made to FIG. 5 which depicts head light 14 when light source 24 is illuminated whereby light L therefrom is transmitted. The polymeric body which is in the form of lighting lens 28 preferably transmits at least about 5%, and preferably in a range from about 40–60%, of the light directed from light source 24 so as to operate as a typical head light for a vehicle. It should be understood that without the inclusion of a coloring agent, the lighting lens 28 will appear to be transparent upon illumination which is typical of most lenses in a head light lamp assembly.

Figure 6:
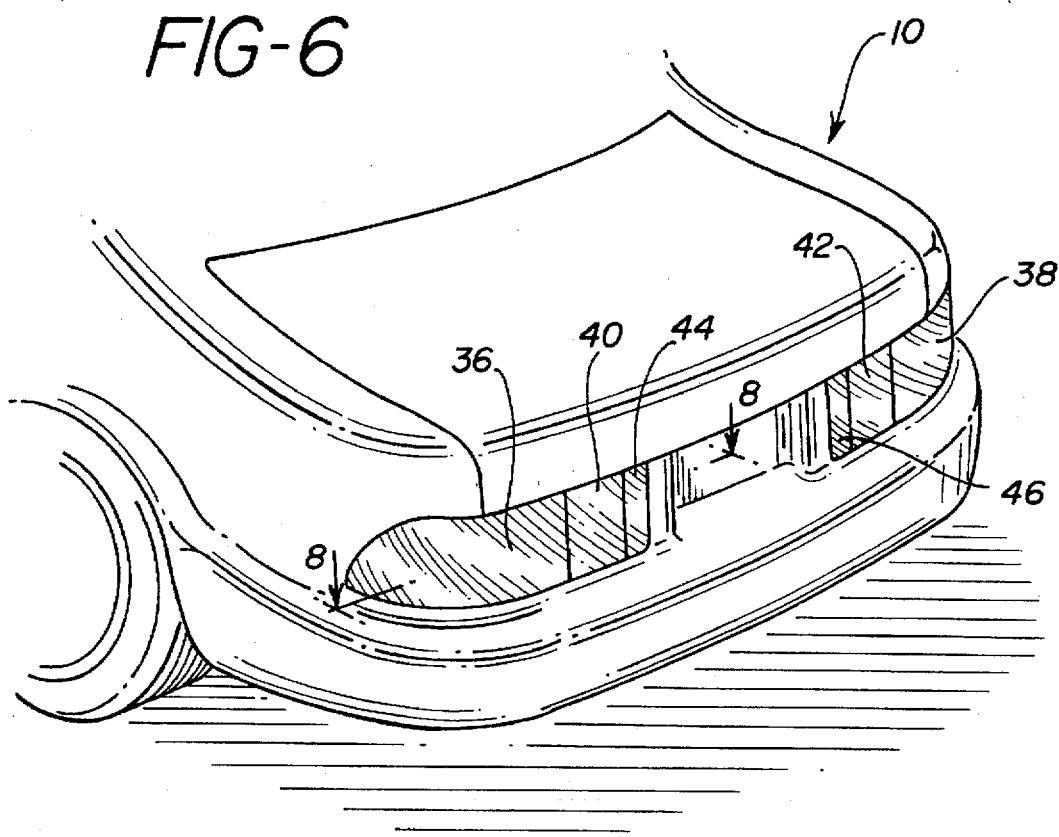
FIG. 6 is a fragmentary perspective view of the rear portion of an automobile in which the rear lighting system incorporates the polymeric body of the invention.
Figure 7:
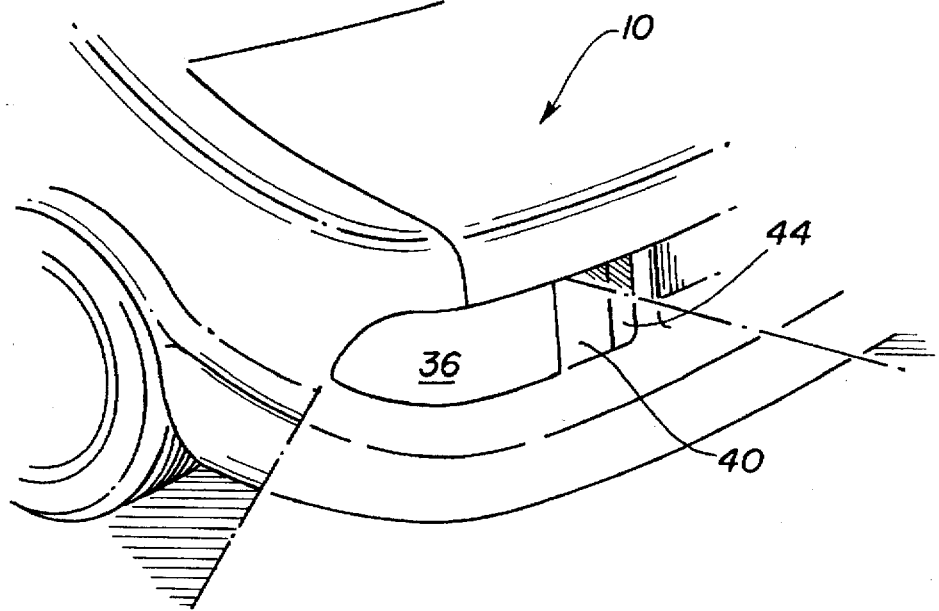
FIG. 7 is a fragmentary perspective view of the automobile as shown in FIG. 6 wherein the rear lighting system is illuminated.

FIGS. 6 and 7 illustrate the rear portion of automobile 10 wherein the rear lighting system incorporates the polymeric body of the invention. While the observer will perceive the rear portion of automobile 10 to have a uniform reflective appearance, there may be at least three different mounted light assemblies each having a different color when illuminated. By way of example, FIG. 6 depicts a pair of brake lights 36 and 38, a pair of turn signal lights 40 and 42, and a pair of reverse lights 44 and 46. As seen in FIG. 6, each of these lights is reflective when not illuminated and designed to be indiscernible. FIG. 7, however, shows brake light 36, turn signal light 40 and reverse light 44 when they are all illuminated from a back light source. Consequently, by using the polymeric body of the invention, automobile stylists and designers are provided with increased design degrees of freedom.

Figure 8:
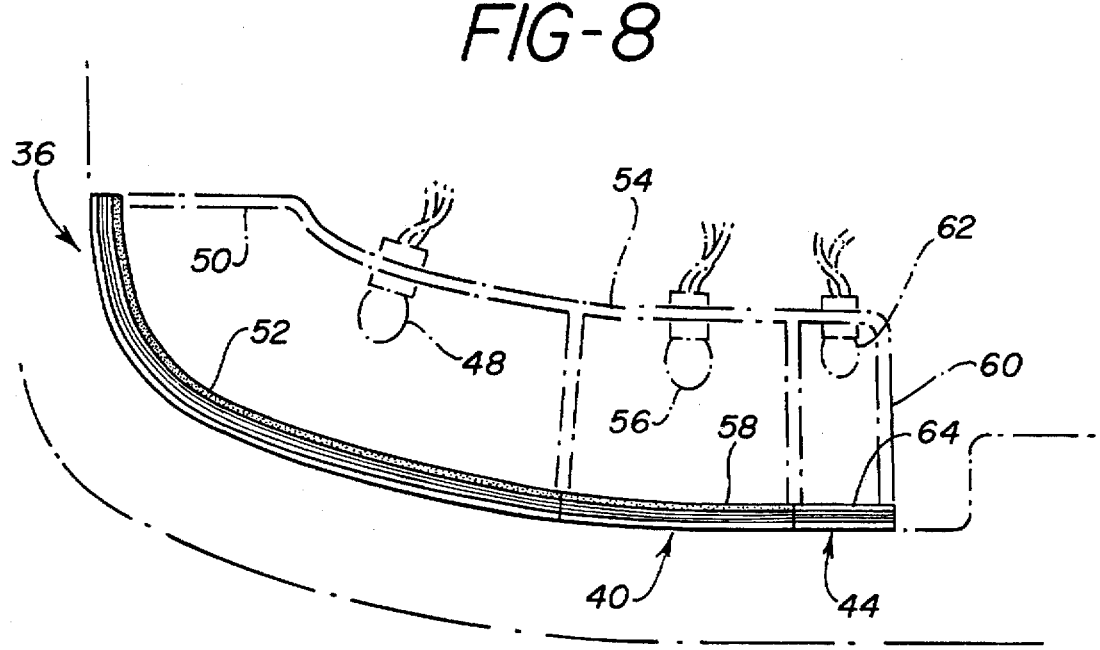
FIG. 8 is a cross-sectional view taken along view line 8—8 in FIG. 6 of one half of the rear lighting system on the automobile depicted FIGS. 6–7.
Figure 9:
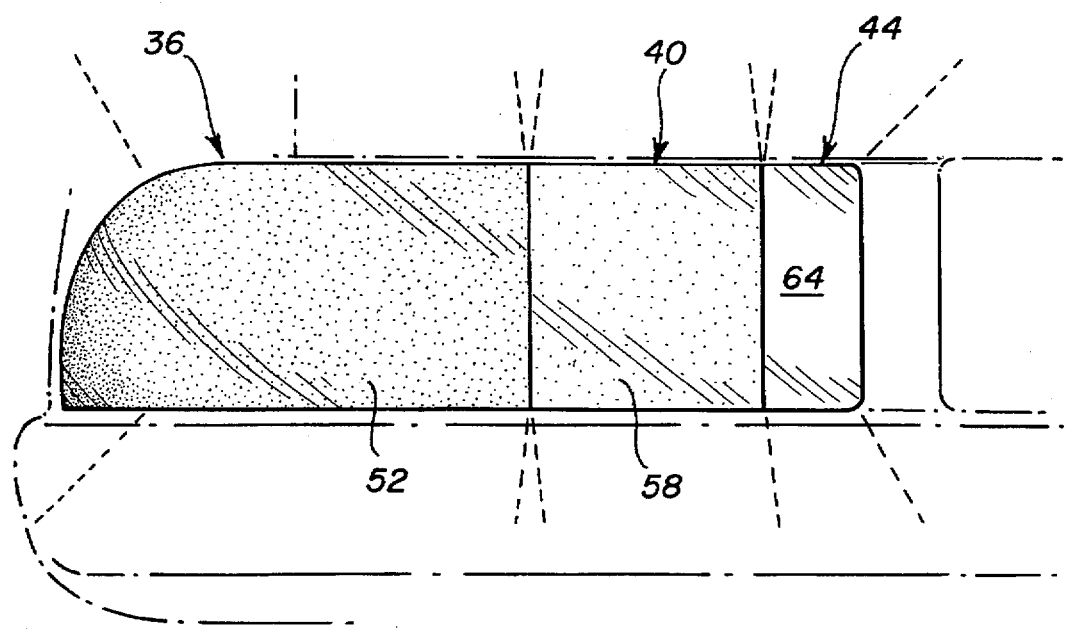
FIG. 9 is a rear elevational view of the rear lights shown in FIG. 8 in which the lights are illuminated.

Referring now to FIG. 8, a cross-sectional view taken along view line 8—8 in FIG. 6 is presented. FIG. 8 shows brake light 36, turn signal light 40 and reverse light 44 as depicted in FIG. 6 for purposes of providing a better understanding of the manner in which the polymeric body forms such parts. Brake light 36 comprises a light source 48 mounted within a housing 50 while the polymeric body forms a lighting lens 52 through which light is transmitted. As those skilled in the art will appreciate, the coloring agent used in lighting lens 52 should be a red dye or pigment so that brake light 36 emits a red light as depicted in FIG. 9. Alternatively, the light source 48 can be the appropriate color. Similarly, turn signal light 40 includes its own housing 54 to separate a light source 56 from light source 48 in housing 50.

The polymeric body is used to form a lighting lens 58 for turn signal light 40, as well. A yellow (amber) coloring agent, such as a yellow (amber) dye or pigment, can be included in lighting lens 58 so that a yellow light is transmitted upon illumination of light source 56 as shown in FIG. 9. If the entire lens piece shown FIGS. 8 and 9 is formed as a single piece, then the various colors can be appropriately placed by using thermoformable silk-screening inks. On the other hand, if the various lenses are individual pieces as presently shown, the dyes and pigments discussed above can be used.

Finally, reverse light 44 also includes a housing 60 within which a light source 62 is mounted for illumination of lighting lens 64 which is formed from the polymeric body of the invention. Typically, lighting lens 64 will not include a coloring agent since reverse lights are white or colorless. Thus, upon illumination of light source 62, light is transmitted through lighting lens 64 which is transparent upon illumination as shown in FIG. 9. It should be understood that lighting lenses 52, 58 and 64 can be styled so that they mesh into one another so as to form a smooth contour along the rear portion of automobile 10. Further, the aforementioned lighting lenses are designed to have the same appearance and color as adjacent portions of the automobile so that they are indiscernible to the casual observer.

Figure 10:
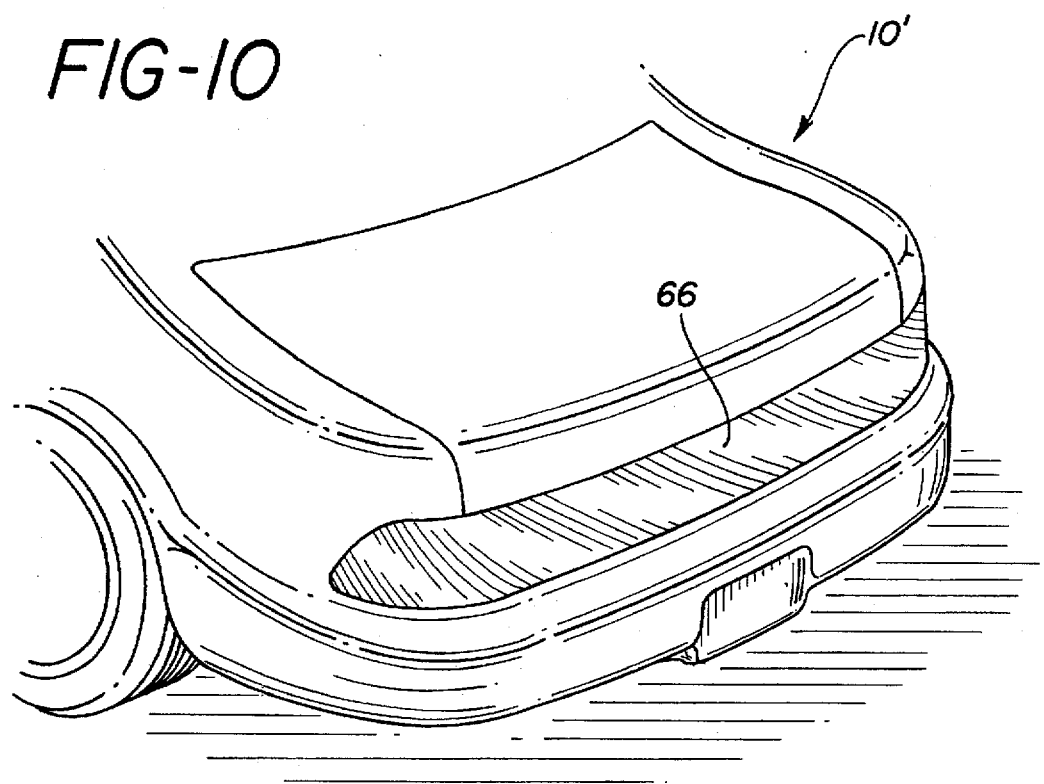
FIG. 10 is a fragmentary perspective view of the rear portion of an automobile similar to FIGS. 6 and 7 with the addition of a centrally located rear indicia display light.
Figure 11:
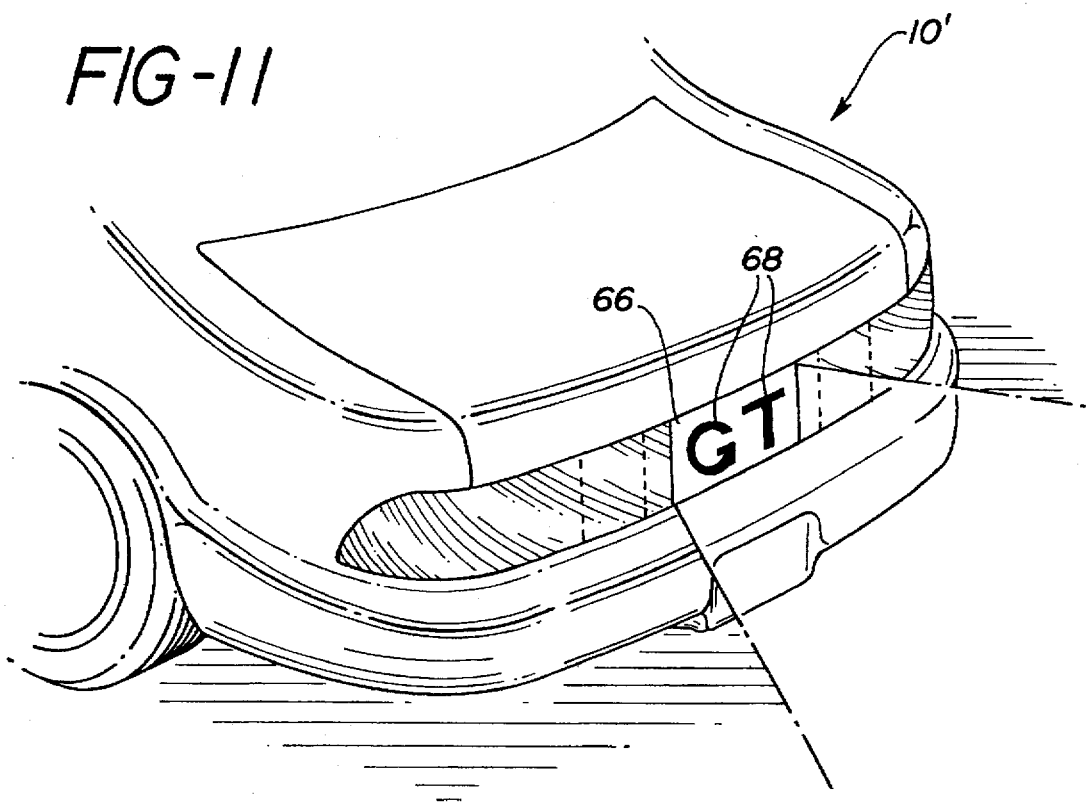
FIG. 11 is a fragmentary perspective view of the automobile shown in FIG. 10 in which the indicia display light is illuminated.

Reference is now made to FIGS. 10 and 11 which illustrate another embodiment of the invention. FIGS. 10 and 11 show automobile 10' having a rear lighting assembly similar to that of which is shown in FIGS. 6–9 wherein an additional lighting lens 66 abridges the various lights and includes a back light source (not shown). The polymeric body of the invention is used to form lighting lens 66 in which at least one of the major surfaces thereof has indicia 68 printed thereon. Those skilled in the art will appreciate the multitude of indicia which may be printed or otherwise affixed to lighting lens 66 formed of the polymeric body. The indicia 68, for example, may be insert molded, embossed, etched thereon and the like.

In addition to other possible indicia, the polymeric body may be used for purposes other than automotive in which indicia is concealed in the polymeric body yet displayed upon illumination of a back light source. For example, the polymeric body of the invention may be used in the interior of a vehicle, for example, to illuminate controls with the appearance of a chrome knob with a green label or printed indicia indicating "volume" when traveling during the night. In the present case, however, FIG. 11 illustrates indicia 68 indicative of the style of automobile 10' which is displayed upon illumination from a back light source.

Figure 12:
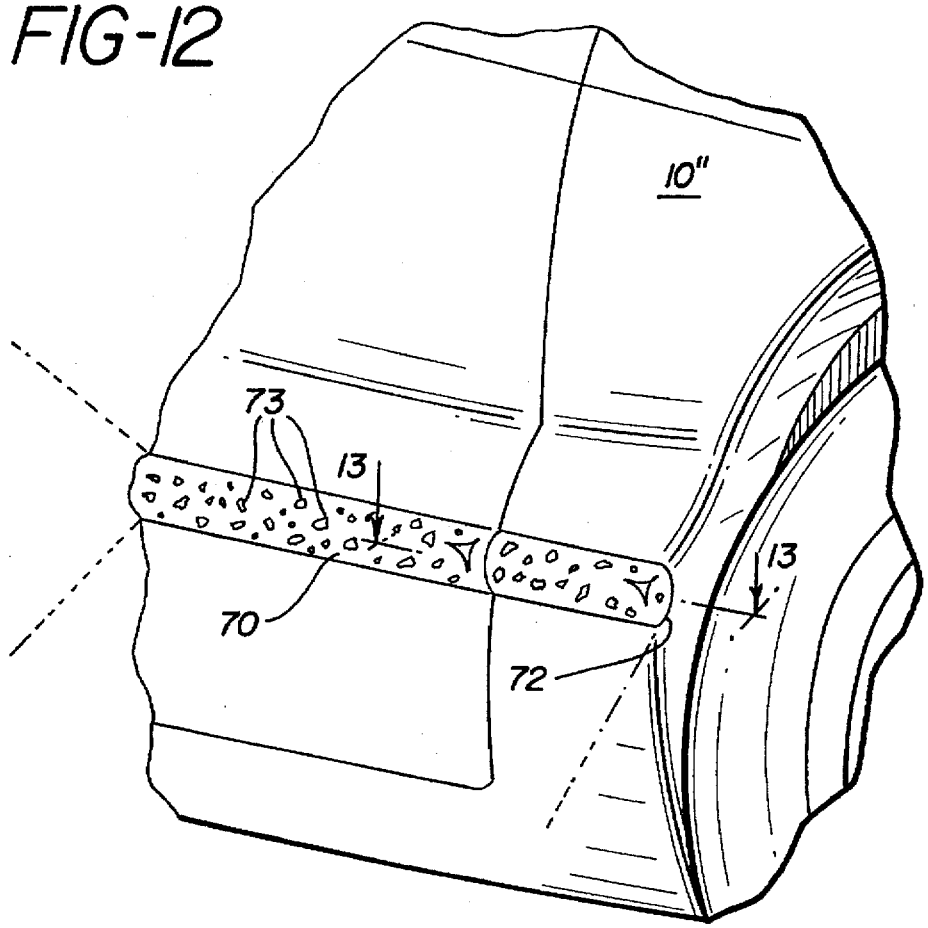
FIG. 12 is a fragmentary perspective view of an automobile having a body side molding formed of the polymeric body wherein a light source is mounted adjacent an edge thereof for illuminating the molding.
Figure 13:
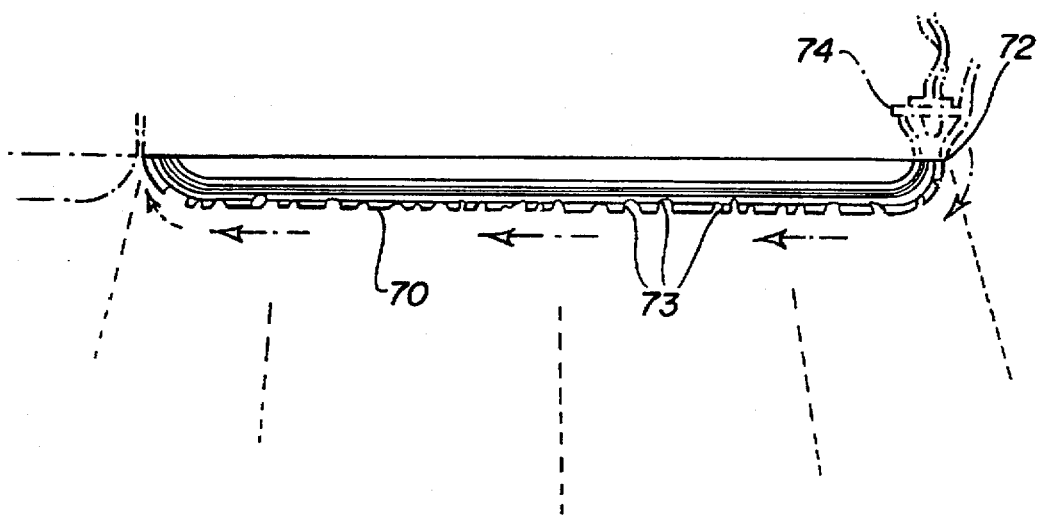
FIG. 13 is a plan view of the molding depicted in FIG. 12 in which the light source is illuminated.

FIGS. 12 and 13 illustrate yet another embodiment of the invention in which the polymeric body is used to provide decorative trim which can be illuminated by a side light source. More specifically, the polymeric body is in the form of a body side molding 70 having an edge 72 adjacent which a light source 74 is mounted. The side molding 70 includes a plurality of irregularities collectively designated by reference numeral 73 which are necessary for transmitting light peripherally. Such irregularities 73 may take a variety of forms including but not limited to notches, conical dots or indentations, conical protrusions, embossments or any other shaped indentation or protrusion which would render the surface of side molding 70 other than uniformly smooth.

As seen in FIG. 13, light source(s) 74 is mounted in the side panel of automobile 10" so as to be concealed. When the lighting system for automobile 10" is turned on, light source 74 illuminates side molding 70 and therefore the polymeric body, which in turn, transmits light from light source 74. In this way, side molding 70 is illuminated with the other lights on automobile 10" so as to illuminate the automobile further for aesthetic as well as safety purposes. A coloring agent can be incorporated in or present on at least one of the layers in side molding 70 to allow stylists and designers to add automotive body style options.

It should be understood by those skilled in the art that a light source positioned adjacent an edge of the polymeric body of the invention in a form other than that of which is described herein can be used to illuminate the major faces thereof. Such a feature of the polymeric body may be found in a variety of areas in addition to decorative trim on an automobile. As mentioned above, residential and commercial lighting applications can use side lighting to conceal the light source at one end of the polymeric body which is in the form of a lighting lens. Such a feature of the polymeric body increases the styling design options in residential and commercial lighting applications, as well. Additionally, the polymeric body of this embodiment may also be back lit to increase design options in all of the aforementioned applications.

Figure 14:
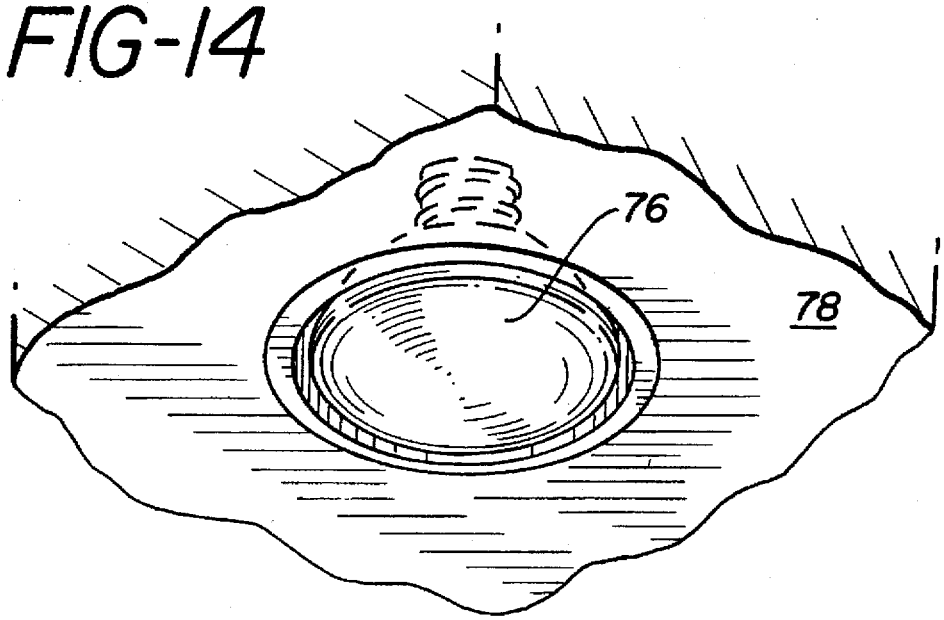
FIG. 14 is a fragmentary perspective view of a room ceiling in which a colored or uncolored (silvery) lens formed from the polymeric body is mounted.
Figure 15:
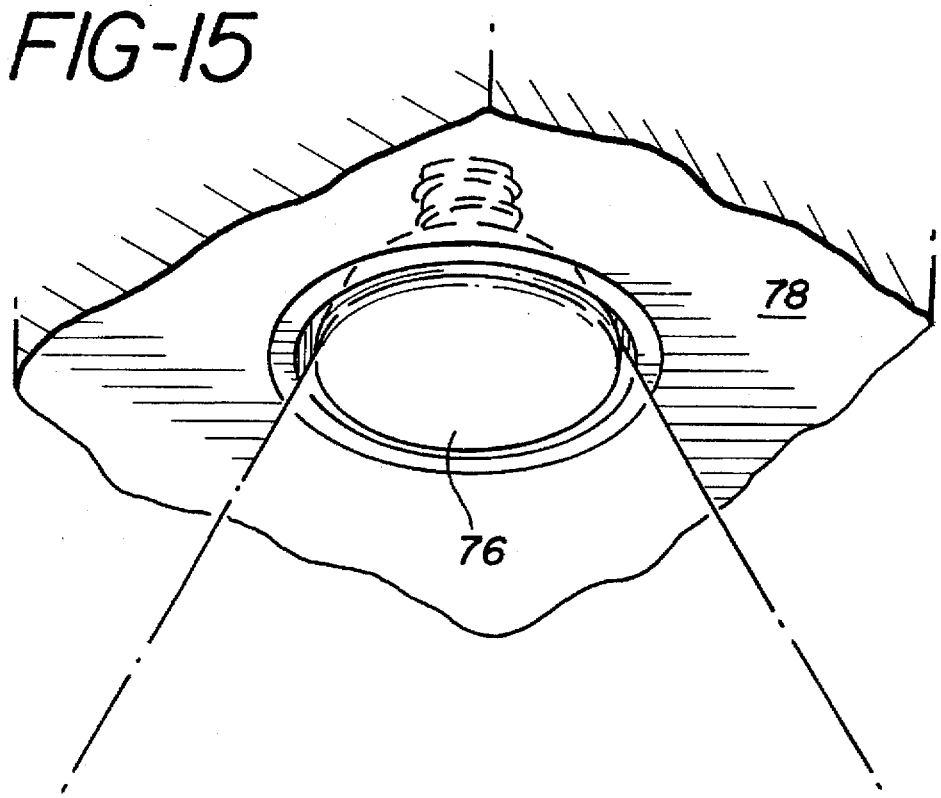
FIG. 15 is a fragmentary perspective view as shown in FIG. 16 in which the colored lens is illuminated.

Referring now collectively to FIGS. 14 and 15, another environment in which the polymeric body of the invention can be used is shown. FIG. 14 is a fragmentary perspective view of a colored lens 76 (also referred to in the art as a refractor or diffuser) mounted in a ceiling 78 for commercial or residential lighting purposes. As shown, lens 76 has a reflective appearance which can be rendered indiscernible when ceiling 78 is formed of a similar reflective material as oftentimes found in commercial lighting applications. Upon illumination, lens 76 provides the room in which it is mounted with light, with or without color.

In a preferred embodiment, lens 76 comprises a light source (not shown) enclosed by the polymeric body in the form of a sheet or film having at least two major surfaces wherein the one major surface faces the light source and the other major surface faces opposite thereto. As discussed with the previous embodiments, a coloring agent can be incorporated in or present on at least one of the major surfaces of the polymeric sheet or film such that colored light is emitted through lens 76 upon illumination of the light source (not shown). Other environments in which lens 76 may be incorporated are possible without departing from the scope of the invention.

Figure 16:
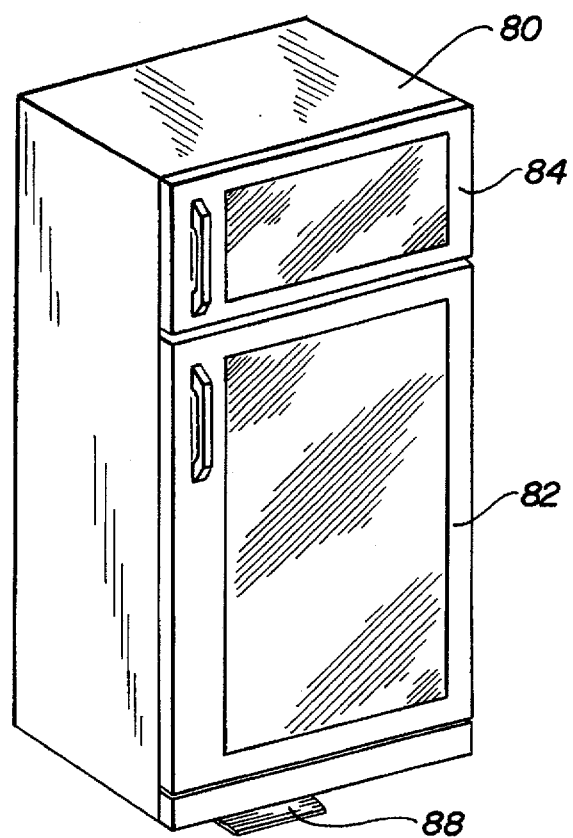
FIG. 16 is a perspective view of a refrigerator which includes a freezer door and a refrigerator formed from the polymeric body of the invention.
Figure 17:
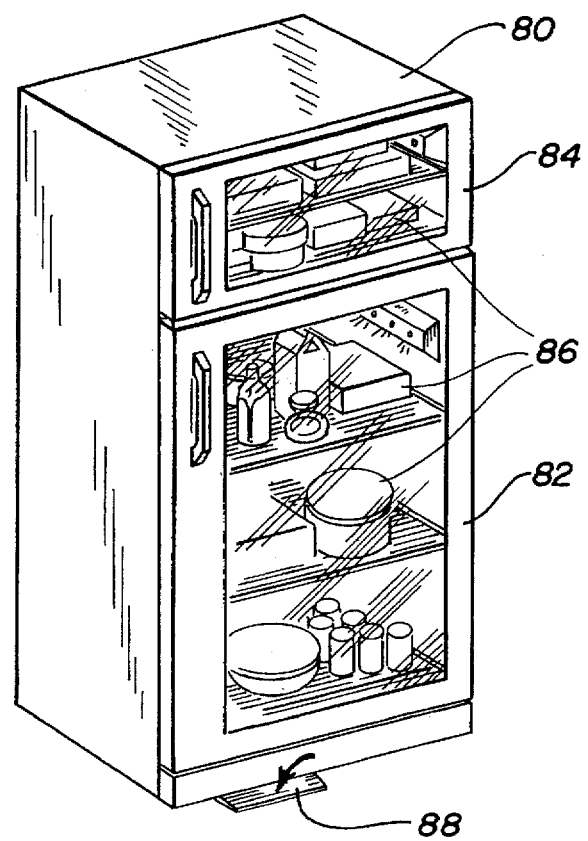
FIG. 17 is a perspective view of the refrigerator shown in FIG. 16 wherein an internal light has been illuminated to permit viewing of the refrigerator contents.

Reference is made to FIGS. 16 and 17 which illustrate another application of the polymeric body of the invention to consumer appliances and durable goods. FIG. 16 shows a perspective view of a refrigerator 80 having a refrigerator door 82 and a freezer door 84. The polymeric body of the invention may form the entire refrigerator door 82 and freezer door 84. By providing refrigerator 80 with refrigerator door 82 and freezer door 84 made from the polymeric body, a user can view its contents 86 by merely illuminating a light source in refrigerator 80 with, for example, a foot switch 88 or other sensor device. As a result, one can view contents 86 as shown in FIG. 17 without opening either of refrigerator door 82 or freezer door 84, thereby resulting in substantial energy savings. Optionally, only a portion of refrigerator door 82 and/or freezer door 84 can be formed from the polymeric body for such purposes.

Figure 18:
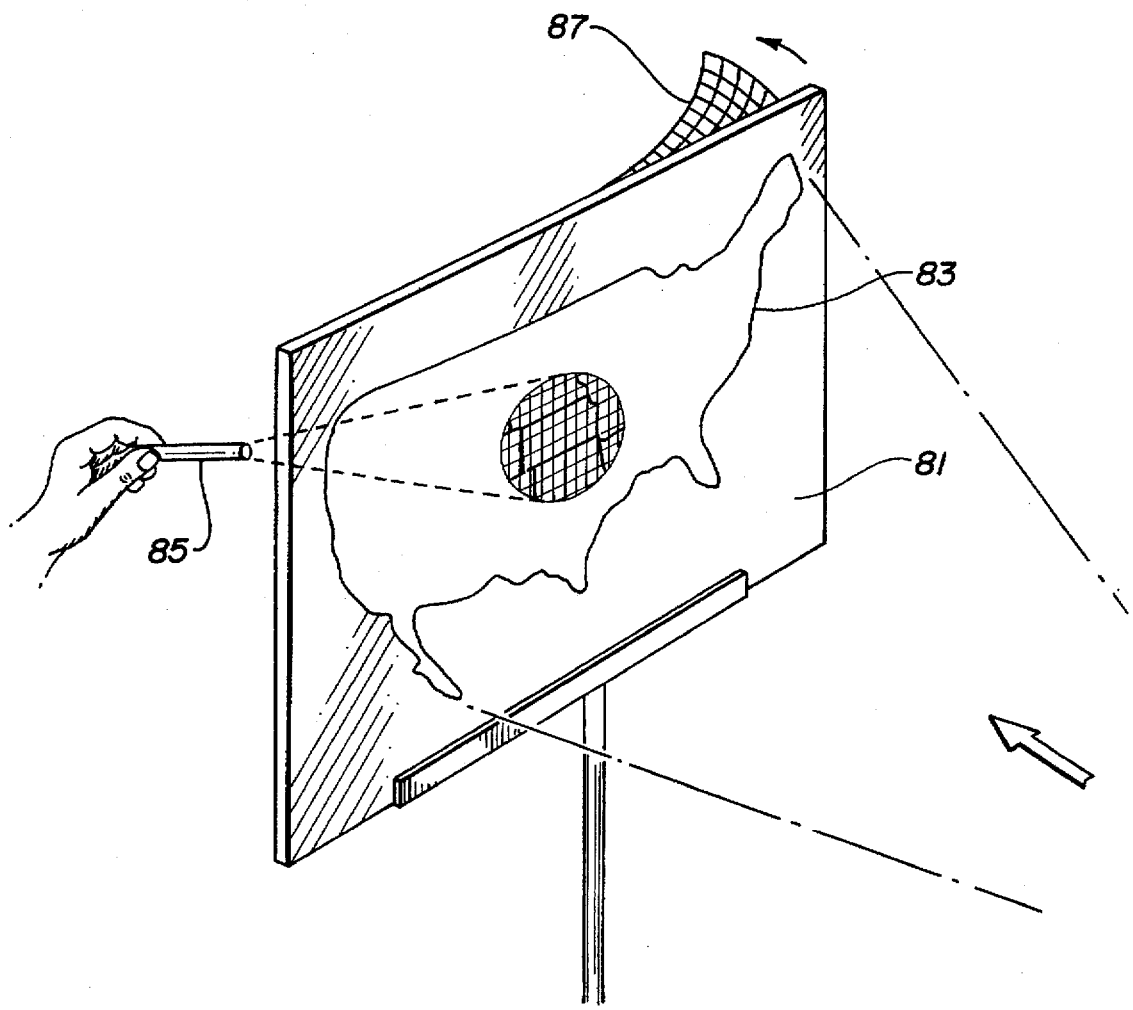
FIG. 18 is a perspective view of another embodiment in which the polymeric body has an image casted upon it while also being back lit.

FIG. 18 depicts the image projection embodiment of the present invention. Specifically, this embodiment is directed to the polymeric body in the form of a sheet 81 having an image 83 projected on a surface thereof and which can be back lit with a light source 85. The image 83 is shown to be a map but virtually any image can be projected onto sheet 81 by means of a projector or the like (not shown). The light source 85 can be in the form of, for example a LED or array of LEDs, which can be used as a pointer or the like. Preferably, sheet 81 of this embodiment comprises a multilayer reflective polymeric body as described in detail above. By way of example, sheet 81 can include a grid patterned backing 87 to provide a grid superposed against image 83 upon illumination of light source 85. In this way, the versatility of this embodiment is increased, for example, in the area of instruction or display as depicted in FIG. 18. Additionally, sheet 81 can be designed to be transparent upon illumination with a back light source yet reflect image 83 so that it will appear to an observer that image 83 is floating in space. Those skilled in the art will appreciate the unlimited ways in which sheet 81 and image 83 can be modified for use in other applications.

The present invention also provides a preferred method by which the polymeric body can be formed into the desired product for the above-referenced applications, all of which have essentially no perceived iridescence. As is the case with most products, some of which are described above, there is a need for high surface fidelity, for example, sharp details, surface texturing, embossed patterns, and the like, which leads to the need for high clamp tonnages in the molding process. Conventional compression molding or thermoforming methods impart high levels of internal stress into the products formed from the polymeric body of film of the invention. Additionally, conventional molding techniques have caused uneven flowing and thinning of the various layers in the polymeric body or film. All of this results in a product having undesirable iridescence. The present method maintains the non-iridescent property of the polymeric body or film in the final product.

Figure 19:
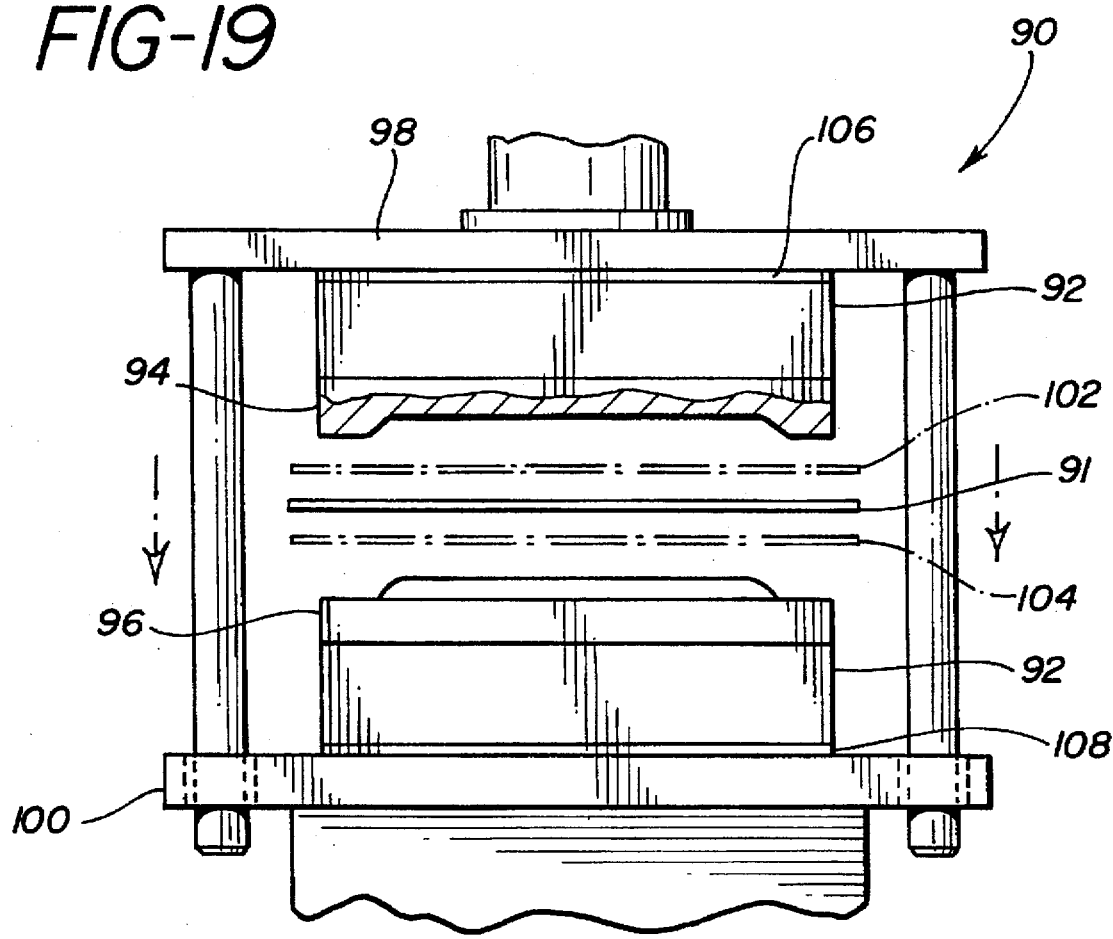
FIG. 19 is a side elevational view of a molding assembly which is used to form the polymeric body of the invention into the desired product.

The method contemplates forming the polymeric body of the invention into a variety of useful parts by thermoforming a sheet of the reflective material. FIG. 19 depicts a molding assembly 90 to illustrate the method of the invention which thermoforms a reflective polymeric sheet 91 into the desired product. For purposes of clarity, details of molding apparatus unnecessary to an understanding of the invention have been omitted from FIG. 19. However, those skilled in the art will appreciate that such known features of conventional molding apparatus may be used without departing from the scope of the invention.

The method comprises the step of providing molding assembly 90 including a mold, collectively referenced as 92, having a face half 94 and a corresponding core half 96 together which define the contour of the product. Face half 94 and core half 96 of mold 92 each have a press platen 98 and 100, respectively, adapted to compress face half 94 and core half 96 against one another. Preferably, molding assembly 90 includes means for cushioning mold 92 when face half 94 and core half 96 are compressed together by press platens 98 and 100 to mold the product.

In a preferred embodiment, the cushioning means comprises an elastomeric blanket 102 inserted between face half 94 and core half 96 of mold 92, and specifically, between the polymeric sheet 91 and face half 94 as shown in phantom lines. In addition to or, in place of elastomeric blanket 102, an elastomeric blanket 104 can be inserted between polymeric sheet 91 and core half 96 also shown in phantom lines. Additionally, or alternatively, the cushioning means may comprise an elastomeric blanket 106 inserted between press platen 98 and mold 92. In a similar fashion, an elastomeric blanket 108 can be inserted between press platen 100 and mold 92. Additionally, the present method may include the step of forming at least one of core half 96 and face half 94 from an elastomeric material to serve as additional or alternative cushioning means.

The method further comprises the steps of inserting between face half 94 and core half 96 of mold 92 polymeric sheet 91 having essentially no perceived iridescence, and compressing each of press platens 98 and 100 in molding assembly 90 such that face half 94 and core half 96 of mold 92 are compressed against polymeric sheet 91 while any one of elastomeric blankets 102, 104, 106 or 108 cushions mold 92 to prevent uneven flowing and thinning of the layers in polymeric sheet 91 to produce the desired product. The present method facilitates alignment of the part to be formed, especially in less expensive and sophisticated molds, and also allows for larger engineering tolerances.

Figure 20:
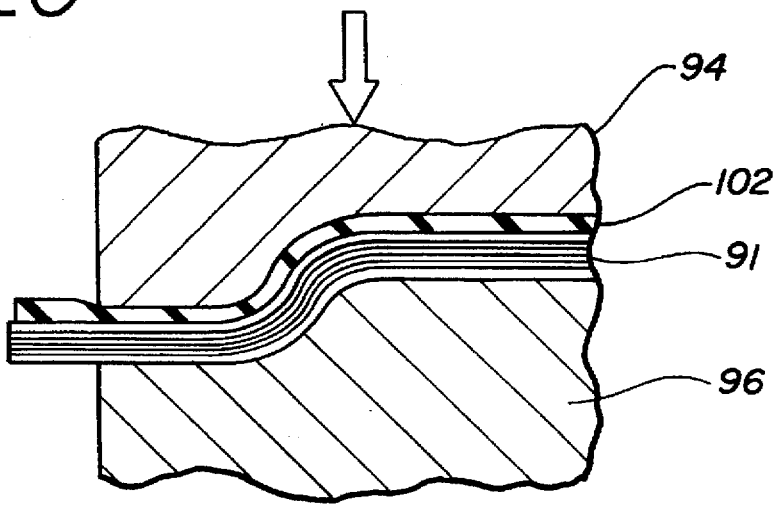
FIG. 20 is an enlarged fragmentary side elevational view of the molding assembly shown in FIG. 18 in which the mold is compressed together to form the desired product.

FIG. 20 is an enlarged fragmentary cross-sectional view of polymeric sheet 91 having elastomeric blanket 102 included to serve as the cushioning means. As shown in FIG. 20, polymeric sheet 91 maintains its uniformity with the aid of elastomeric blanket 102 as face half 94 and core half 96 are compressed together. Suitable materials which can be used for elastomeric blanket 102 include high temperature silicone rubber and other high temperature rubber materials. It should be understood that additional cushioning means such as elastomeric blanket 104 may be included without departing from the scope of the invention.

In accordance with another embodiment of the invention, a present method for making a reflective multilayer polymeric product having essentially no iridescence is provided whereby an elastomeric blanket is not inserted into molding assembly 90. Rather, at least one of face half 94 and core half 96 is formed of an elastomeric material so as to cushion mold 92 when face half 94 and core half 96 are compressed together to mold the desired product. This method, although similar to the previous embodiment, provides a method by which the insertion of an elastomeric blanket is not necessary. The remaining forming steps are the same as previously described in that polymeric sheet 91 having essentially no perceived iridescence is inserted between face half 94 and core half 96 of mold 92, and each of press platens 98 and 100 in molding assembly 90 are compressed such that face half 94 and core half 96 are compressed against polymeric 91 sheet while the elastomeric material in either of face half 94 or core half 96 cushions mold 92 to prevent uneven flowing and thinning.

With the present invention, a polymeric body which is reflective, and yet transmits light upon exposure to a back light source is provided which can be used for a variety of applications including automotive, commercial, and residential lighting. The invention also provides a preferred method for making the polymeric body such that it retains its non-iridescent properties in the ultimate product into which it is thermoformed.

Having described the invention in detail and by reference to preferred embodiments thereof, it will be apparent that modifications and variations are possible without departing from the scope of the invention which is defined in the appended claims. For example, applications and environments in which the polymeric body is used other than those described herein are possible without departing from the scope of the invention.

What is claimed is:

1. In combination, a multilayer reflective polymeric body of at least first and second diverse polymeric materials arranged in substantially parallel alternating layers, said body having first and second major surfaces, and means for illuminating said second major surface, and wherein said first and second polymeric materials differ from each other in refractive index by at least 0.03, said body including a sufficient number of layers such that said body reflects at least 40% of light impinging on said first major surface thereof such that when said body is viewed in reflection it displays a substantially uniform reflective appearance, said body transmitting at least 5% of light directed through said body from said second major surface, said reflective polymeric body further including a coloring agent incorporated in or present on at least one of said first and second major surfaces such that when said body is illuminated from said second major surface, said body exhibits the color of said coloring agent.

2. The reflective polymeric body of claim 1 wherein said coloring agent is selected from the group consisting of pigments and dyes.

3. The reflective polymeric body of claim 1 wherein said first polymeric material is a polyurethane and said second polymeric material is polymethylmethacrylate.

4. The reflective polymeric body of claim 1 wherein said first polymeric material is a polyurethane and said second polymeric material is a polyether imide.

5. The reflective polymeric body of claim 1 wherein said first polymeric material is a polycarbonate and said second polymeric material is a miscible blend of polyvinylidene fluoride and polymethylmethacrylate.

6. The reflective polymeric body of claim 1 wherein said first polymeric material is polystyrene and said second polymeric material is a copolymer of ethylene and at least one unsaturated monocarboxylic acid.

7. The reflective polymeric body of claim 1 wherein said first polymeric material is polycarbonate and said second polymeric material is a polymethylmethacrylate.

8. The reflective polymeric body of claim 1 wherein at least one of said first and second major surfaces has a brushed, grained or roughened surface.

9. The reflective polymeric body of claim 1 wherein at least one of said first and second major surfaces has been etched to provide a matte, diffuse, or pewter finish.

10. The reflective polymeric body of claim 1 wherein at least one of said first and second major surfaces has been embossed.

11. The reflective polymeric body of claim 1 wherein said body has an absence of visibly perceived iridescence.

12. The reflective polymeric body of claim 1 wherein said body comprises at least 500 layers.

13. The reflective polymeric body of claim 1 wherein said body is thermoformable.

14. The reflective polymeric body of claim 1 further including a coloring agent is incorporated into at least one of said layers between said first and second major surfaces of said body.

15. The reflective polymeric body of claim 1 wherein a substantial majority of said layers of said body have optical thicknesses in the range where the sum of the optical thicknesses in a repeating unit of said first and second polymeric materials is greater than about 190 nm.

16. The reflective polymeric body of claim 1 wherein said body is in the form of a lens.

17. The reflective polymeric body of claim 1 wherein said body is in the form of a decorative trim component for a vehicle.

18. The reflective polymeric body of claim 1 wherein said body forms a portion of a consumer appliance.

19. The reflective polymeric body of claim 1 wherein said body forms a portion of a surface of a refrigerator door.

20. The reflective polymeric body of claim 1 wherein at least one of said first and second major surfaces of said body comprises first and second portions, wherein said first portion has said coloring agent incorporated in or present thereon and said second portion is substantially transparent upon exposure to light directed through said body from said second major surface thereof.

21. In combination, a multilayer reflective polymeric film having at least first and second diverse polymeric materials arranged in substantially parallel alternating layers, said film having first and second major surfaces, and means for illuminating said second major surface, and wherein said first and second polymeric materials differ from each other in refractive index by at least 0.3, said film including a sufficient number of layers such that said film reflects at least 40% of light impinging on said first major surface thereof such that when said body is viewed in reflection it displays a substantially uniform reflective appearance, said body transmitting at least 5% of light directed through said film from the second major surface, said reflective polymeric body further including a coloring agent incorporating in or present on at least one of said first and second major surfaces such that when said body is illuminated from said second major surface, said body exhibits the color of said coloring agent.

22. A light source enclosed by a multilayered reflective polymeric sheet having first and second major surfaces wherein said second major surface faces said light source and said first major surface faces opposite said second major surface, said sheet having at least first and second diverse polymeric materials arranged in substantially parallel alternating layers, said film including a coloring agent incorporated in or present on at least one of said first and second major surfaces, wherein said first and second polymeric materials differ from each other in refractive index by at least 0.03, said sheet including a sufficient number of layers such that said sheet reflects at least 40% of light impinging on said first major surface thereof while transmitting at least 5% of light directed through said sheet from said second major surface such that when said sheet is illuminated, said sheet exhibits the color of said coloring agent.

23. The light source of claim 22 wherein said light source is a light-emitting diode.

24. A lamp assembly comprising a light source mounted in a housing having at least one surface in the form of a lighting lens, said lighting lens comprising at least first and second diverse polymeric materials arranged in substantially parallel alternating layers, said lighting lens having first and second major surfaces wherein said second major surface faces said light source and said first major surface faces opposite said second major surface, said lighting lens having a coloring agent incorporated in or present on at least one of said first and second major surfaces, wherein said first and second polymeric materials differ from each other in refractive index by at least 0.03, said lighting lens including a sufficient number of layers such that said lighting lens reflects at least 40% of light impinging on said first major surface thereof while transmitting at least 5% of light directed through said lighting lens from said second major surface such that when said lighting lens is illuminated, said lighting lens exhibits the color of said coloring agent.

25. The combination of claim 1 in which a first coloring agent is present on said first major surface of said body and a second coloring agent is incorporated in said body or present on said second major surface thereof, said first and second coloring agents being of different colors, such that when viewed in reflecting from said first surface, said body displays a uniform reflective appearance and exhibits the color of said first coloring agent and when illuminated from behind said second major surface, said first major surface exhibits a third color.

26. The combination of claim 21 in which a first coloring agent is present on said first major surface of said body and a second coloring agent is incorporated in said body and a second major surface thereof, said first and second coloring agents being of different colors, such that when viewed in reflection from said first surface, said body displays a uniform reflective appearance and exhibits the color of said first coloring agent and when illuminated from behind second major surface, said first major surface exhibits a third color.

27. A multilayer reflective polymeric body of at least first and second diverse polymeric materials arranged in substantially parallel alternating layers, said body having first and second major surfaces, wherein said first and second polymeric materials differ from each other in refractive index by at least 0.03, said body including a sufficient number of layers such that said body reflects at least 40% of light impinging on said first major surface thereof such that when said body is viewed in reflection it displays a substantially uniform silvery reflective appearance, said body transmitting a sufficient amount of light when light is directed through said body from said second major surface so as to appear transparent when viewed from said first major surface.

28. A multilayer reflective polymeric film having at least first and second diverse polymeric materials arranged in substantially parallel alternating layers, said film having first and second major surfaces, wherein said first and second polymeric materials differ from each other in refractive index by at least 0.03, said film including a sufficient number of layers such that said film reflects at least 40% of light impinging on said first major surface thereof such that when said film if viewed in reflection it displays a substantially uniform silvery reflective appearance, said film transmitting a sufficient amount of light when light is directed through said film from said second major surface so as to appear transparent when viewed from said first major surface.

* * * * *